United States Patent [19]
Serdar, Jr. et al.

[11] Patent Number: 5,873,560
[45] Date of Patent: Feb. 23, 1999

[54] GIMBAL SUPPORT SYSTEM WITH UNI-DIRECTIONAL ROLL STIFFNESS

[75] Inventors: Luka Serdar, Jr., Lexington; Gary M. Colello, Lunenberg, both of Mass.; Clifford Gunsallus, N. Canton, Conn.; William Doolittle, Ann Arbor, Mich.

[73] Assignee: Chrysler Corporation, Auburn Hills, Mich.

[21] Appl. No.: 642,169

[22] Filed: May 2, 1996

[51] Int. Cl.⁶ ...................................... F16M 1/04
[52] U.S. Cl. .................... 248/562; 248/610; 248/638; 248/647; 248/659
[58] Field of Search .................. 248/562, 567, 248/580, 581, 610, 612, 638, 647, 659, 667, 675

[56] References Cited

U.S. PATENT DOCUMENTS

| | | | |
|---|---|---|---|
| 1,808,939 | 6/1931 | Summers | 248/581 X |
| 3,090,586 | 5/1963 | Schwegler et al. | 248/567 |
| 3,874,472 | 4/1975 | Deane . | |
| 3,886,810 | 6/1975 | Sugiyama et al. . | |
| 4,131,171 | 12/1978 | Keyes . | |
| 4,148,192 | 4/1979 | Cummings . | |
| 4,165,795 | 8/1979 | Lynch et al. . | |
| 4,309,620 | 1/1982 | Bock . | |
| 4,583,505 | 4/1986 | Frank et al. . | |
| 4,588,040 | 5/1986 | Albright, Jr. et al. . | |
| 4,597,463 | 7/1986 | Barnard . | |
| 4,631,456 | 12/1986 | Drescher et al. . | |
| 4,680,986 | 7/1987 | Elsner . | |
| 4,888,949 | 12/1989 | Rogers . | |
| 4,900,962 | 2/1990 | Hockney et al. . | |
| 4,961,352 | 10/1990 | Downer et al. . | |
| 5,184,521 | 2/1993 | Tyler | 248/612 X |
| 5,238,215 | 8/1993 | Jeker et al. | 248/581 X |
| 5,291,975 | 3/1994 | Johnson et al. . | |
| 5,319,273 | 6/1994 | Hockney et al. . | |
| 5,353,656 | 10/1994 | Hawkey et al. . | |
| 5,396,140 | 3/1995 | Goldie et al. . | |
| 5,427,194 | 6/1995 | Miller . | |
| 5,442,288 | 8/1995 | Fenn et al. . | |
| 5,465,015 | 11/1995 | Anastas et al. . | |

FOREIGN PATENT DOCUMENTS

| 1140835 | 1/1969 | United Kingdom | 248/610 |
|---|---|---|---|

OTHER PUBLICATIONS

Popular Science Magazine, Emerging Technologies for the Supercar, Jun. 1994.

NASA Tech Briefs, The Digest of New Technology, Jun. 1995, vol. 19, No. 6, pp. 12 and 13.

Primary Examiner—Derek J. Berger
Attorney, Agent, or Firm—Mark P. Calcaterra

[57] ABSTRACT

The present invention is a gimbal system for an apparatus supported in a frame. The gimbal system includes at least two parallel flexible beams positioned on either side of the apparatus. The apparatus is attached to the beam near a center of the beam to the apparatus, such that an active length of the beam is equal to a distance between the beams centers. A first end and a second end of the beam is mounted to the frame. At least one dampening mechanism is attached at a first end to the apparatus and at the other end to the frame. The apparatus exhibits axisymmetric roll stiffness independent of the motion of the frame.

10 Claims, 13 Drawing Sheets

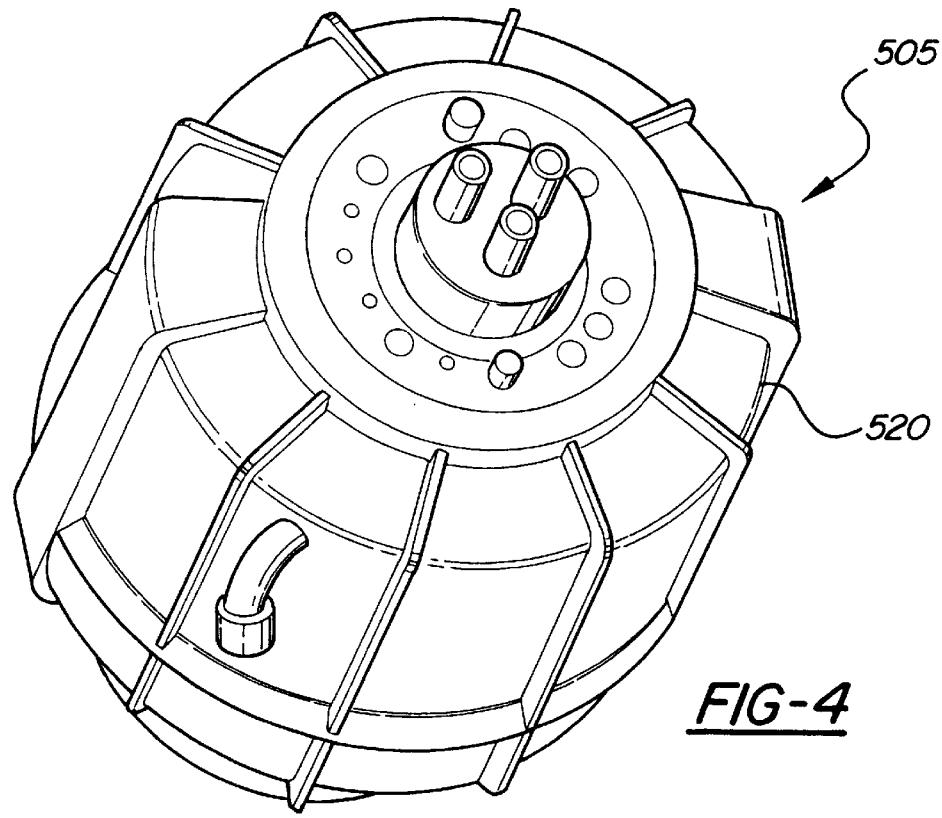
FIG-4
FIG-5
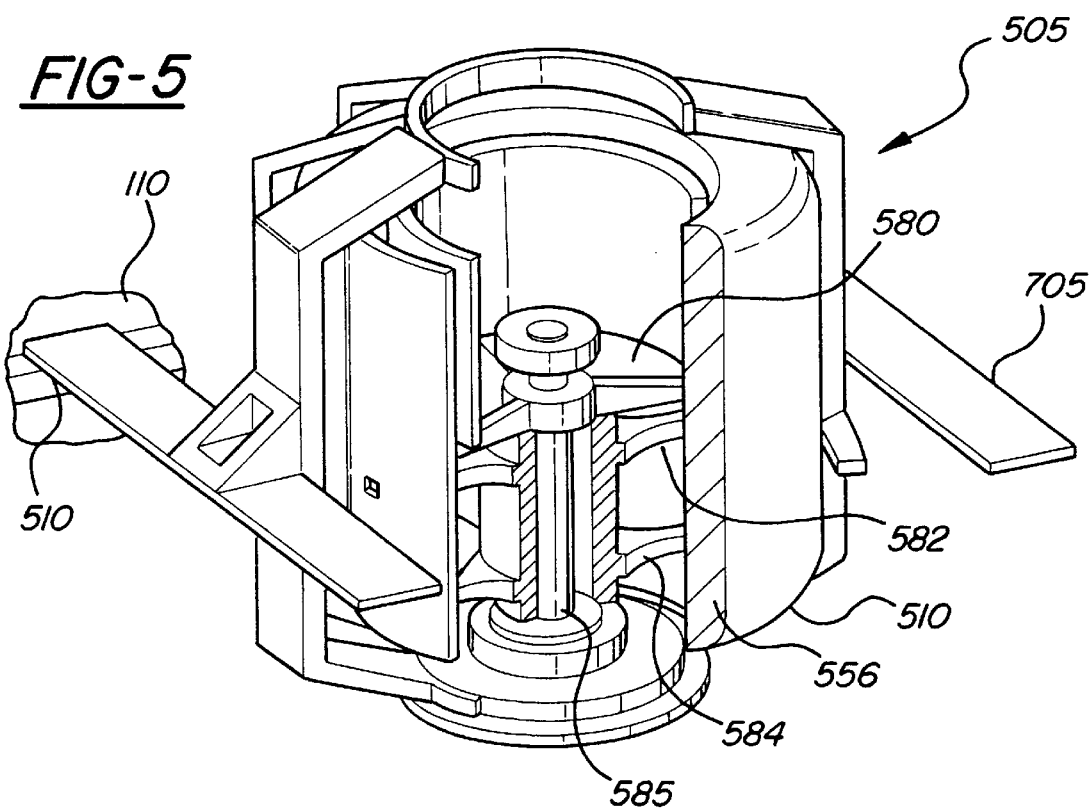

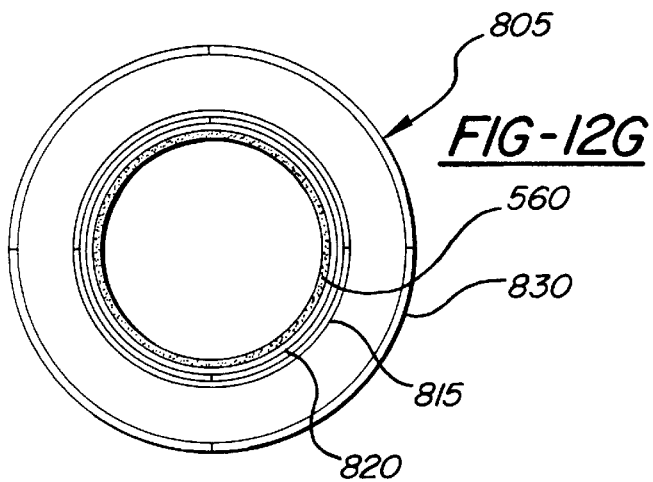
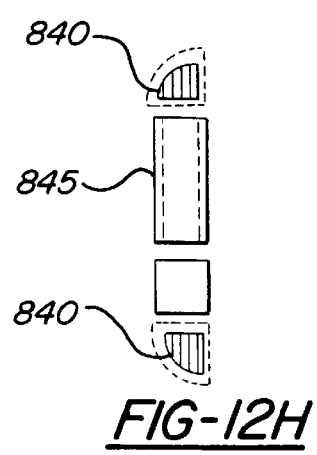
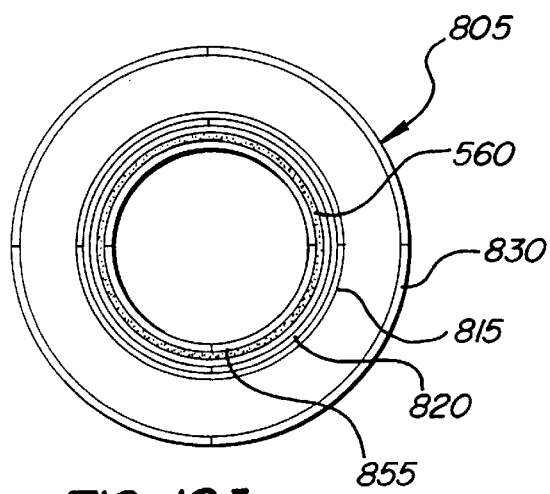
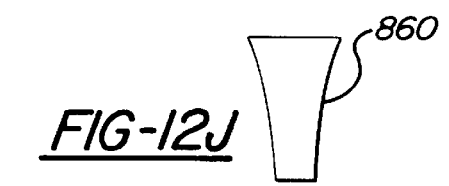
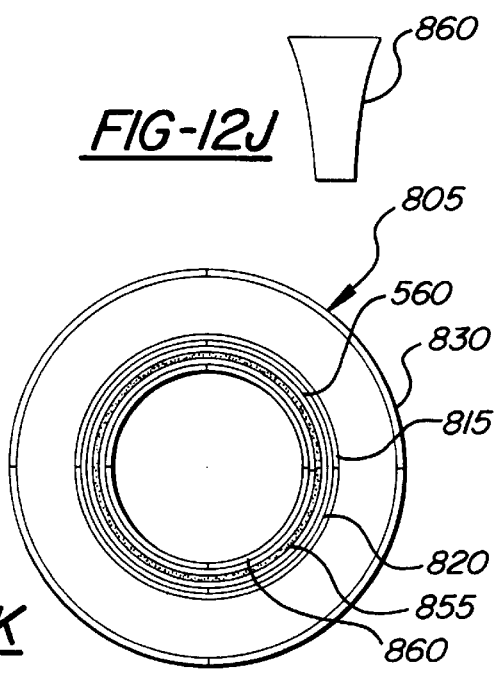
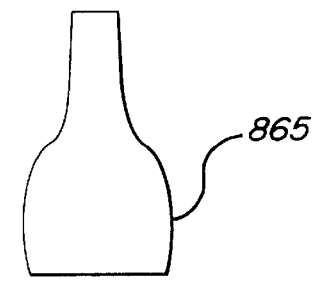
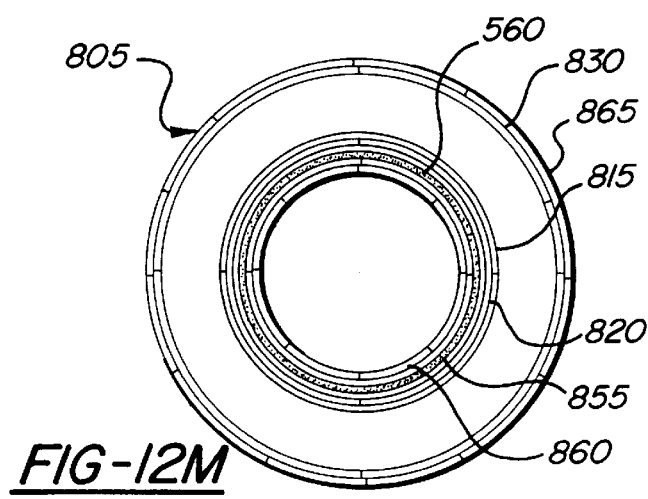

GIMBAL SUPPORT SYSTEM WITH UNI-DIRECTIONAL ROLL STIFFNESS

CROSS-REFERENCE TO RELATED APPLICATIONS

This application pertains to the following co-pending U.S. patent applications disclosing common subject matter:

Ser. No. 08/678,356 for an invention entitled "HYBRID MOTOR VEHICLE";

Ser. No. 08/642,165 for an invention entitled "STATOR COOLING ASSEMBLY";

Ser. No. 08/642,145 for an invention entitled "INDUCTION MACHINE COMMUTATOR";

Ser. No. 08/642,930 for an invention entitled "COOLING OF TURBOALTERNATOR FOR HYBRID MOTOR VEHICLE";

Ser. No. 08/642,086 for an invention entitled "COMPRESSOR OF TURBOALTERNATOR FOR HYBRID MOTOR VEHICLE";

Ser. No. 08/641,962 for an invention entitled "METHOD OF FORMING A RIM CONSTRUCTION FOR A ROTOR";

Ser. No. 08/642,099 for an invention entitled "ASSEMBLY PROCESS OF MAGNET ONTO A ROTOR";

Ser. No. 08/641,964 for an invention entitled "SUBCRITICAL SPOKE FOR HUB TO ROTOR ATTACHMENT";

Ser. No. 08/642,144 for an invention entitled "STATOR FABRICATION PROCESS";

Ser. No. 08/641,967 for an invention entitled "CONTROLLER FOR TURBOALTERNATOR";

Ser. No. 08/641,924 for an invention entitled "SOFT MAGNET FOR A ROTOR";

Ser. No. 08/642,166 for an invention entitled "HYDRAULIC FIT OF TURBOALTERNATOR FOR HYBRID MOTOR VEHICLE";

Ser. No. 08/642,091 for an invention entitled "LAMINATED BALANCE BARS FOR AN ENERGY STORAGE APPARATUS";

Ser. No. 08/642,100 for an invention entitled "METHOD OF ASSEMBLING A STATOR";

Ser. No. 08/641,923 for an invention entitled "SPOKE SHAPE FOR HUB TO ROTOR ATTACHMENT";

Ser. No. 08/642,130 for an invention entitled "FLYWHEEL CONTROLLER";

Ser. No. 08/642,082 for an invention entitled "CENTER ALIGNED PWM";

Ser. No. 08/678,284 for an invention entitled "SOLID ROTOR ASSEMBLY";

Ser. No. 08/678,307 for an invention entitled "TURBOALTERNATOR FOR HYBRID MOTOR VEHICLE";

Ser. No. 08/679,600 for an invention entitled "END CAP TO ROTOR ATTACHMENT";

Ser. No. 08/724,292 for an invention entitled "ROTOR SQUIRREL CAGE CONSTRUCTION";

Ser. No. 08/891,490 for an invention entitled "SEGMENTED RIM CONSTRUCTION FOR A ROTOR"; and Ser. No. 08/916,180 for an invention entitled "ROTOR SPEED ESTIMATOR".

This application further pertains to the following U.S. Patents disclosing common subject matter:

U.S. Pat. No. 5,696,414 for an invention entitled "SLIDING SPOKE ROTOR TO HUB ATTACHMENT";

U.S. Pat. No. 5,637,939 for an invention entitled "POCKET ATTACHMENT TO RIM"; and U.S. Pat. No. 5,721,459 for an invention entitled "OUTPUT VOLTAGE REGULATION USING ROTOR GROWTH".

BACKGROUND OF THE INVENTION

1. Field of the Invention

The present invention relates generally to hybrid vehicles, and, more particularly, to an energy storage apparatus for a hybrid motor vehicle.

2. Description of the Related Art

Since the invention of powered vehicles, many different powertrain systems have been attempted, including a steam engine with a boiler or an electric motor with a storage battery. It was, however, the four-stroke internal combustion engine invented by Otto in 1876, and the discovery of petroleum in 1859 that provided the impetus for the modern automotive industry.

Although gasoline emerged as the fuel of choice for automotive vehicles, recent concerns regarding fuel availability and increasingly stringent Federal and State emission regulations have renewed interest in alternative fuel powered vehicles. For example, alternative fuel vehicles may be powered by methanol, ethanol, natural gas, electricity or a combination of fuels.

A dedicated electric powered vehicle offers several advantages: electricity is readily available; an electric power distribution system is already in place; and an electric powered vehicle produces virtually zero emissions. There are several technological disadvantages that must be overcome before electric powered vehicles gain acceptance in the marketplace. For instance, the range of an electric powered vehicle is limited to approximately 100 miles, compared to about 300 miles for a gasoline powered vehicle. Further, the top speed is about half that of a similar gasoline powered vehicle. Significant advances in battery technology are required to overcome these technological disadvantages.

A hybrid powered vehicle, powered by electric and a gaseous fuel, overcomes the technical disadvantages of a dedicated electric vehicle while having almost the same environmental benefit as a dedicated electric vehicle. The performance and range characteristics are comparable to a conventional gasoline powered vehicle.

Therefore, there is a need in the art for a hybrid powertrain system in an automotive vehicle that is energy efficient, has low emissions, and offers the performance of a conventional gasoline powered vehicle.

SUMMARY OF THE INVENTION

It is, therefore, one object of the present invention to provide an energy storage apparatus for a motor vehicle.

It is another object of the present invention to provide an energy storage apparatus for a hybrid powertrain system in a motor vehicle.

It is yet another object of the present invention to provide a flywheel energy storage apparatus for a hybrid powertrain system in a motor vehicle.

It is still another object of the present invention to provide a flywheel energy storage apparatus to replace the battery in a hybrid electric motor vehicle.

It is a further object of the present invention to provide a gimbal support system for an apparatus.

It is still a further object of the present invention to provide a gimbal support system for an energy storage apparatus in a motor vehicle.

It is still a further object of the present invention to provide a gimbal support system having isotropic pitch and roll stiffness.

It is still yet a further object of the present invention to provide a flywheel energy storage apparatus with a gimbal system having an active length of a parallel spring equal to the length between the spring centers.

To achieve the foregoing objects, the present invention is a gimbal system for an apparatus supported in a frame. The gimbal system includes at least two parallel flexible beams positioned on either side of the apparatus. The apparatus is attached near a center of the beam, such that an active length of the beam is equal to a distance between the beams centers. A first end and a second end of the beam is mounted to the frame. At least one dampening mechanism is attached at a first end to the apparatus and at the other end to the frame. The apparatus exhibits axisymmetric roll stiffness independent of the motion of the frame.

One advantage of the present invention is that a new and improved energy storage apparatus for a motor vehicle is provided. Another advantage of the present invention is that an energy storage apparatus such as a flywheel is provided for a hybrid powertrain system in a motor vehicle. Yet another advantage of the present invention is that the flywheel replaces the battery in a hybrid electric motor vehicle. Yet still another advantage of the present invention is that a gimbal support system is provided for an apparatus. A further advantage of the present invention is that a gimbal support system is provided for an energy storage apparatus. Still a further advantage of the present invention is that a gimbal support system is provided for an energy storage apparatus in a motor vehicle. Still yet a further advantage of the present invention is that the gimbal support system exhibits isotropic pitch and roll stiffness. Another advantage of the present invention is to provide a gimbal support system with a pair of parallel beams, each beam having an active length equal to the distance between the beam centers.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 4 is a isometric view of the exterior of an energy storage apparatus according to the present invention.

FIG. 5 is a cut-away view of an energy storage apparatus according to the present invention.

FIGS. 12A through 12M are an illustrative flowchart of a method for constructing the rotor according to the present invention.

DESCRIPTION OF THE PREFERRED EMBODIMENT(S)

Figure 1:
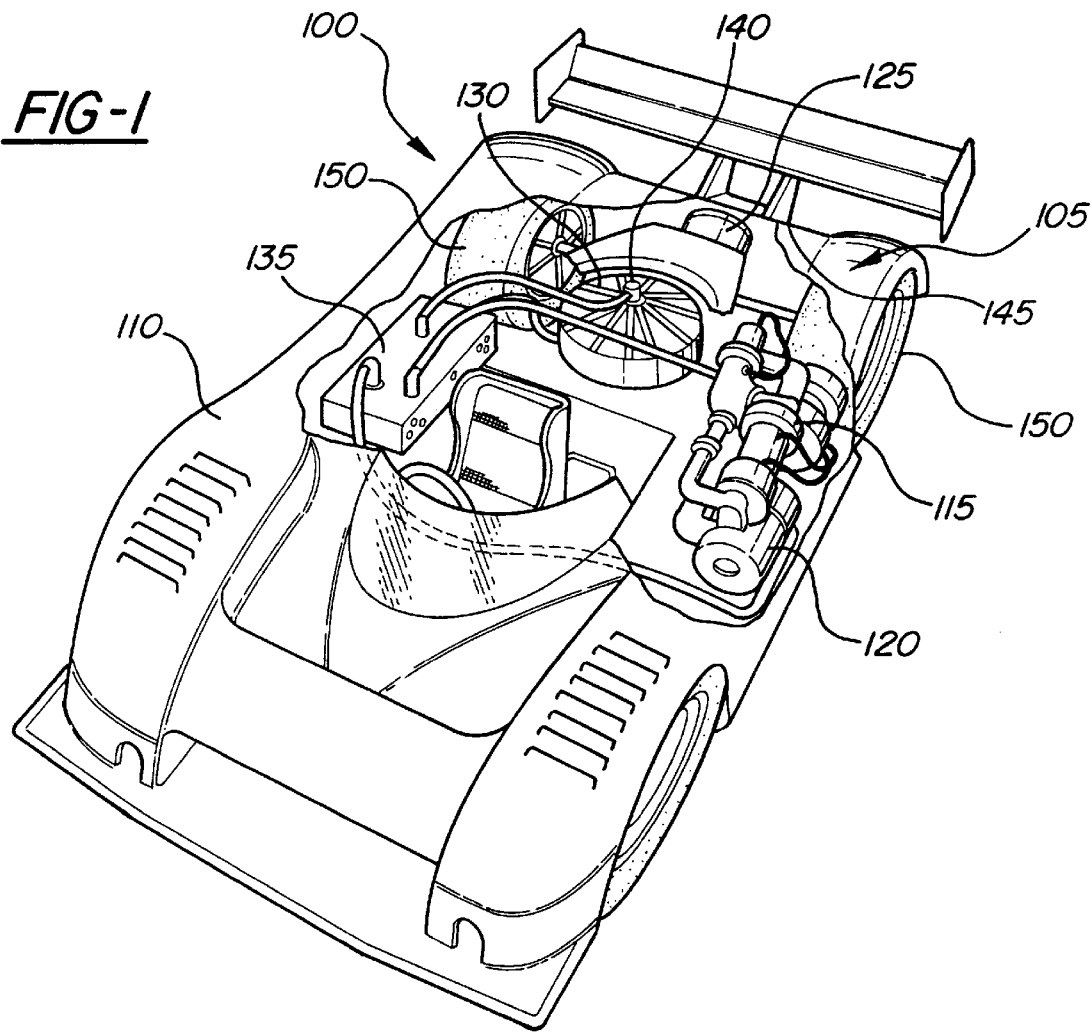
FIG. 1 is a schematic diagram of a hybrid powertrain system for an automotive vehicle according to the present invention.

Referring to FIG. 1, a hybrid powertrain system is illustrated for a vehicle. The vehicle 100 is partially shown in a cut away view illustrating a hybrid powertrain system 105 disposed within a chassis 110. The hybrid powertrain system 105 includes a gas powered turbine engine 115, which in this example is fueled by liquefied natural gas. The turbine engine 115 spins an alternator 120 to generate electric power to operate the vehicle. It should be appreciated that in this example there are two alternators 120 that run at different speeds, such as 60,000 rpm and 100,000 rpm, to produce electricity equivalent to 500 horsepower. It should also be appreciated that the engine 115 and alternator 120 are known as a turboalternator.

A power or vehicle management controller 135 such as a power controller is in communication with the turbine 115 and alternator 120, and manages the distribution of power within the hybrid powertrain system 105. The power controller directs the transfer of power from the alternator 120 to a traction or induction motor 125 using a power transfer mechanism 140, such as a three phase Variable Frequency Alternating Current (VFAC). In this example the traction motor 125 is an AC induction motor 125 capable of producing greater than 750 horsepower. The motor 125 then transfers the power to the drivetrain 145 and eventually the wheels 150 to operate the vehicle 100.

The power controller 135 is also in communication with an energy storage apparatus 130 such as a flywheel. It should be appreciated that the flywheel 130 replaces a battery (not shown but well known in the art) as a conventional vehicle power source. The power controller 135 directs the power from the alternator 120 through VFAC lines 140 to the flywheel 130 for storage during periods of low power demand. The power controller 135 also directs the stored power from the flywheel 130 to the motor 125 during periods of high power demand.

Preferably, the hybrid powertrain system 105 also includes various sensors which are conventional and well known in the art. The outputs of these sensors communicate with the power controller 135. It should also be appreciated that the vehicle 100 includes other hardware not shown, but conventional in the art to cooperate with the hybrid powertrain system 105.

Figure 2:
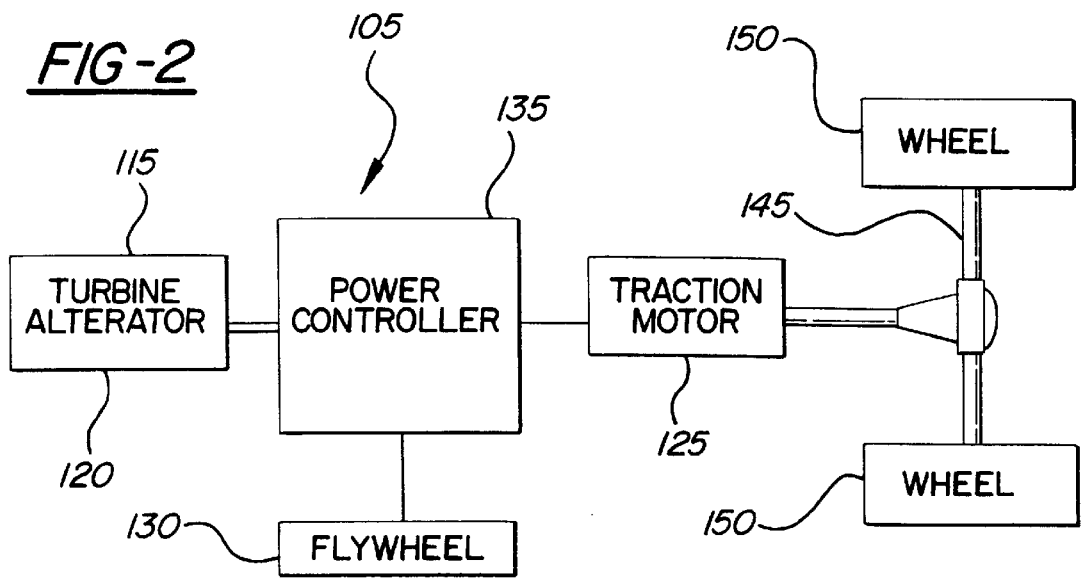
FIG. 2 is a block diagram of an operational relationship of a hybrid powertrain system for an automotive vehicle according to the present invention.
Figure 3:
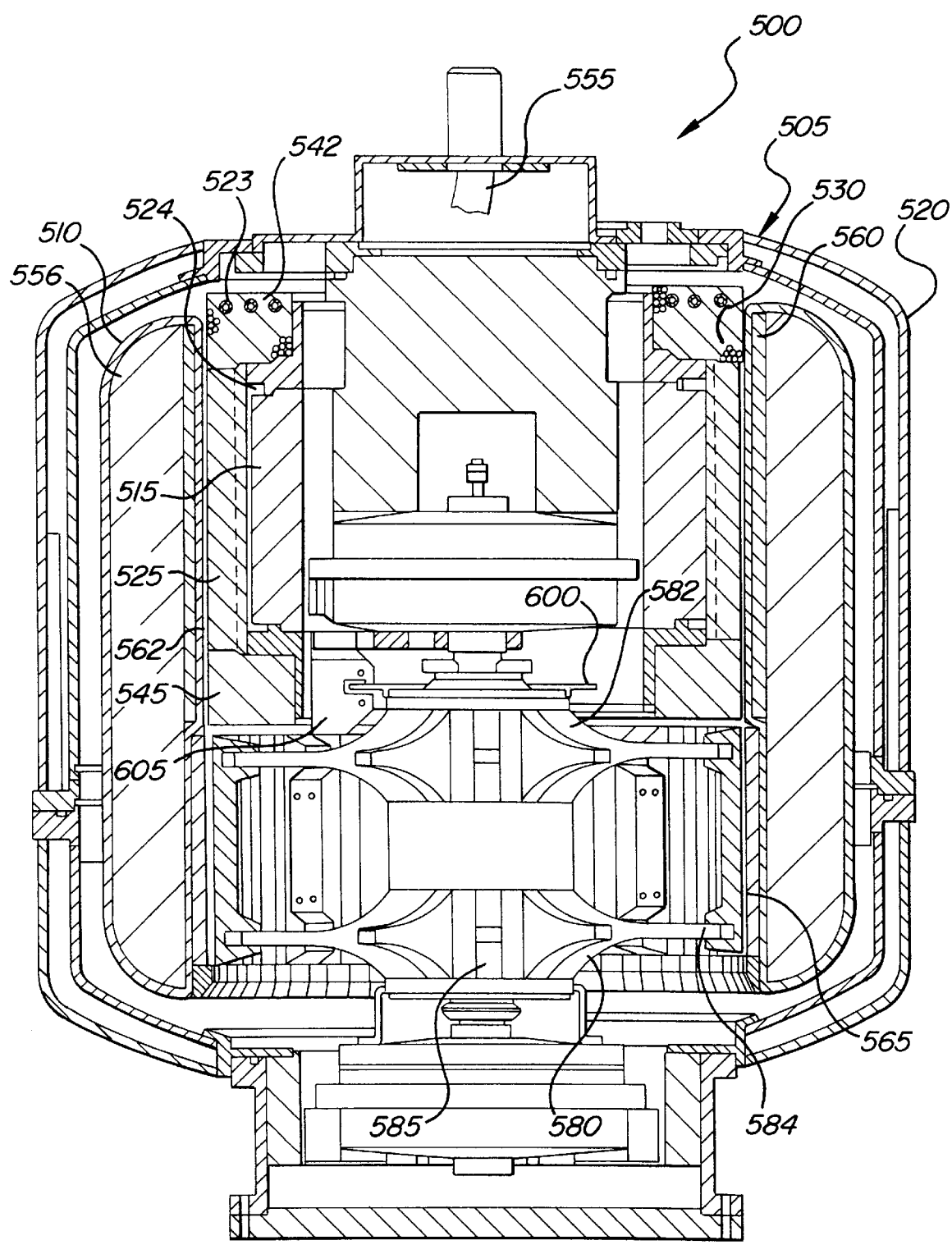
FIG. 3 is an elevational view of an energy storage apparatus according to the present invention.
Figure 6:
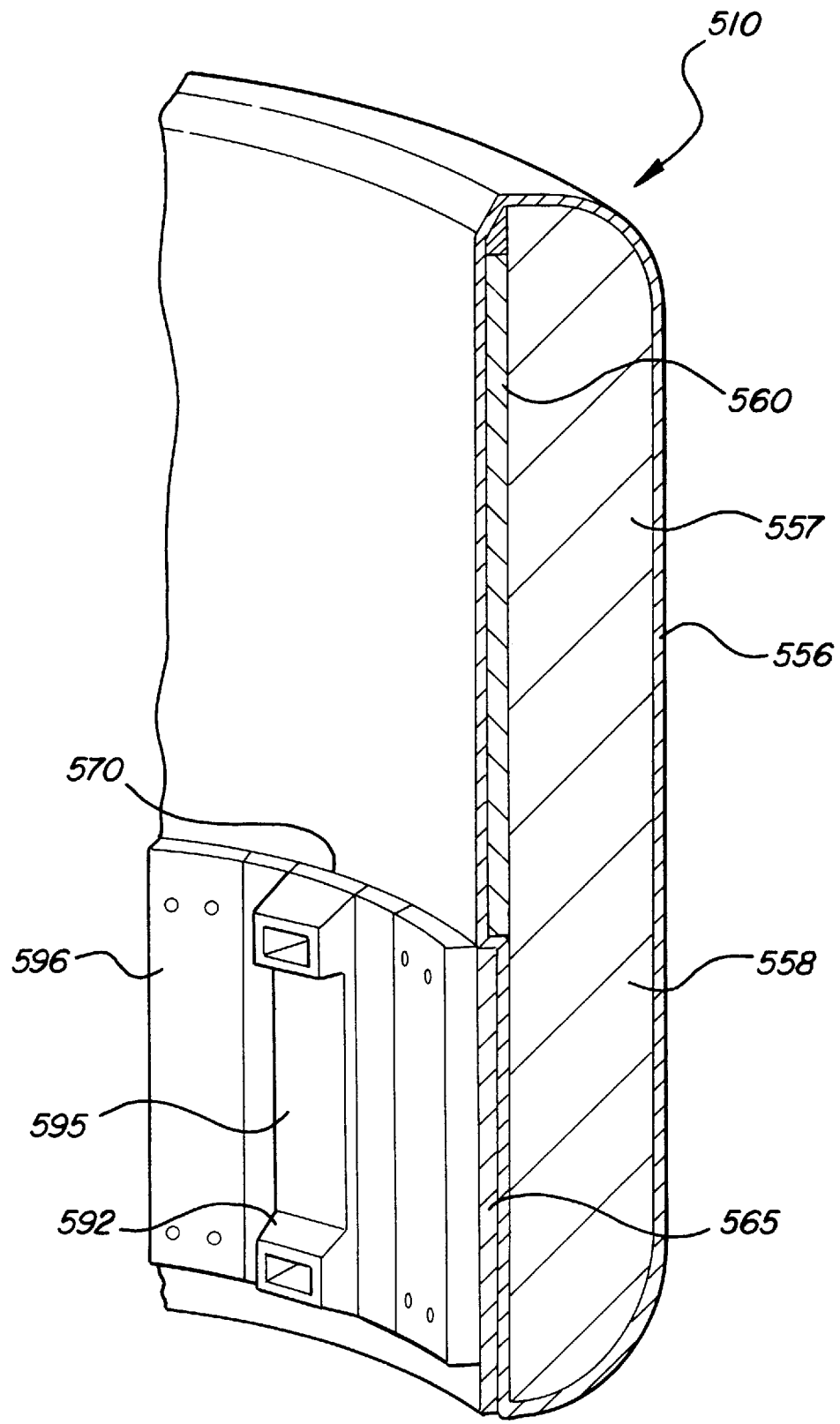
FIG. 6 is a cut-away view of a rotor according to the present invention.

Referring to FIG. 2, the operational relationship of a hybrid powertrain system for an automotive vehicle is illustrated. An input from an operator such as a driver is communicated to the power controller 135. If the driver input requires increased power, the power controller 135 directs the turbine 115 and alternator 120 and if necessary the flywheel 130, to supply power to the motor 125, which in turn supplies power to the drivetrain 145 and eventually to the wheels 150. Alternately, if the driver input indicates decreased power needs, the power controller 135 directs the excess power capacity from the turbine 115 and alternator 120 into the flywheel 130 for storage.

Referring to FIGS. 3 through 6 an energy storage apparatus is illustrated. The energy storage apparatus 500 according to this invention is a flywheel 505, such as that used in a hybrid powertrain system 105 in an automotive vehicle 100. The flywheel 505 has a rotor 510 and stator 515 disposed within a vacuum container such as a housing 520. The rotor 510 rotates about the stator 515. The flywheel 505 stores kinetic energy by rotating at increasingly higher speeds. Similarly, the flywheel 505 releases its stored kinetic energy by slowing its rotation. The rotating components within the flywheel 505 are subjected to high centrifugal loading, causing them to grow radially outward. It should be appreciated that in this example the flywheel 505 weighs approximately 120 pounds and spins at speeds of up to 53,000 rpm.

The stator 515, having a generally cylindrical shape, is fixedly disposed within the housing 520. It should be appreciated that in this example the stator 515 is attached at a first end (not shown) to the housing 520, and at a second end to a stationary axial shaft 585 by a suitable means.

Figure 17:
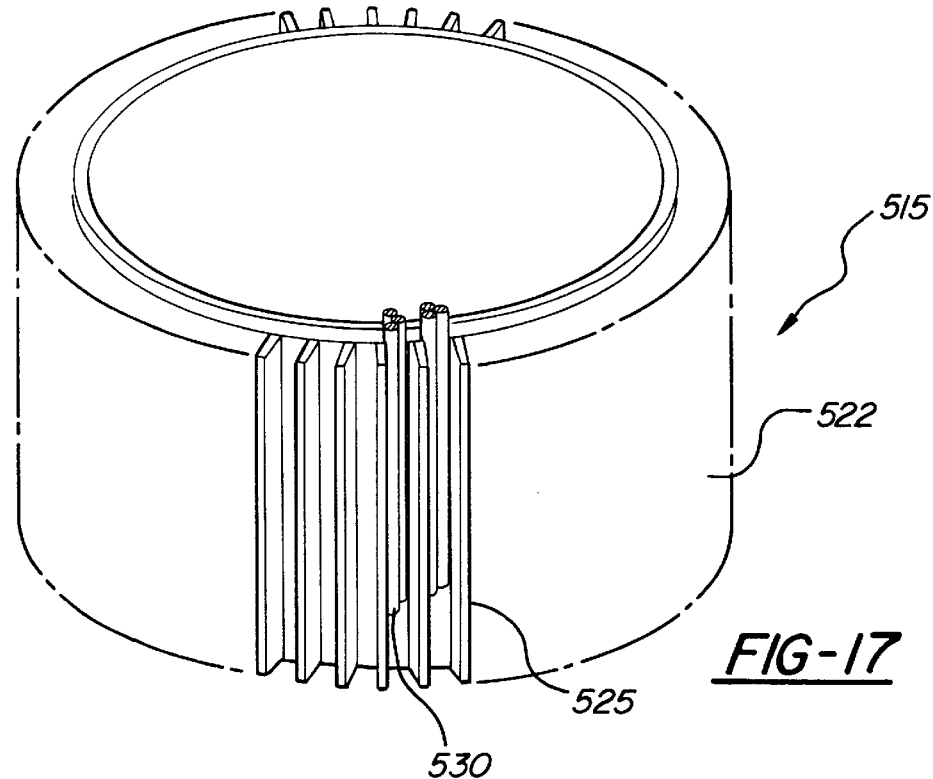
FIG. 17 is a side view of a stator according to the present invention.

Referring also to FIG. 17, a stator 515 is illustrated. The stator 515 includes a bobbin 522 having a sleeve-like shape. Preferably, the bobbin 522 is constructed from a non-magnetic, thermally conductive, electrically non-conductive material with low permeability, such as a ceramic so that the bobbin 522 is electrically and magnetically transparent. Therefore, as the electric fields move around, the flow of the magnetic field is not impeded. The bobbin 522 includes at least one cooling passage 523 for the transportation of a cooling medium, such as water. The bobbin 522 also includes at least one cooling slot 524. Positioned adjacent the at least one cooling passage 523 is at least one, and preferably a plurality of longitudinally extending fins 525 on the exterior surface of the stator 515. The fin 525, as well as the cooling passage 523 dissipates the rising heat in a winding 530. The phase winding 530 axially encircles the bobbin 522, and is separated by the fin 525. The winding 530 is made from a suitably conductive material, such as copper in this example. The passing of alternating current through the winding 530 creates a magnetic field in an air gap 562 between the rotor 510 and stator 515 (to be described).

Figure 18:
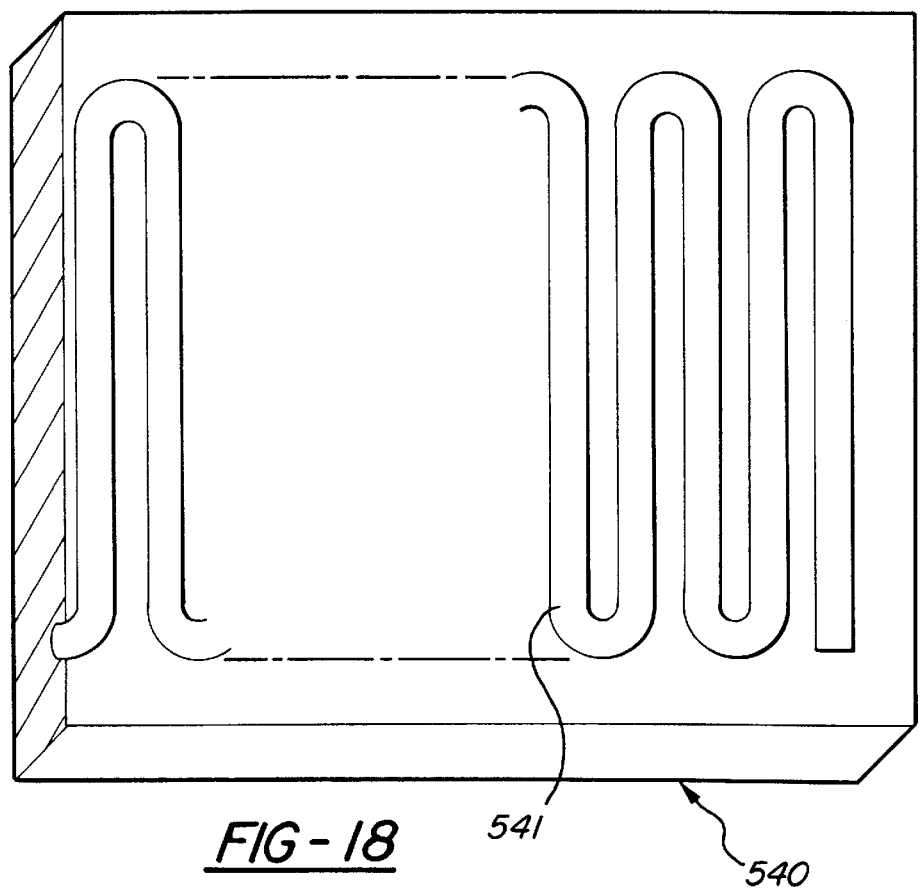
FIG. 18 is a plan view of a winding forming fixture according to the present invention.

Preferably, the winding 530 is preformed prior to installation on the bobbin 522. A forming fixture 540 resembling a long plate having "S" shaped grooves 541 therein is used to preform the winding 530 as illustrated in FIG. 18. The winding 530 is placed within the grooves 541 of the forming fixture 540.

The winding 530 includes an upper end turn 542 located at an upper end of the bobbin 522, and a lower end turn 545 located at a lower end of the bobbin 522. The winding 530 and each end turn 542, 545 respectively form a closed circuit for the winding 530. A wiring assembly 555 (shown in phantom) is connected at one end to the upper end turn 542 and at the other end to the power controller 135.

Referring back to FIGS. 3 through 6, rotor 510, having a generally cylindrical shape in this example, is rotatably supported within the housing 520. The rotor 510 includes a rim 556, with a magnet 560 and a mass 565 disposed on a surface of the rim 556. It should be appreciated that in this example the rotor 510 is positioned such that it circumscribes the stator 515. It should also be appreciated that in this example the cylindrical length of the rotor 510 is greater than that of the stator 515. The magnet 560 interacts with the magnetic field created by the electrical currents passing through the winding 530 and creates a force which creates a motion, rendering the rotation of the rotor 510.

The magnet 560 is also a source of induced voltage generated in the windings 530 in the stator 515. The output voltage generated by the magnet 560 is a function of a gap 562 between the stator winding 530 and rim 556, and the speed of the rotor 510, providing other factors are constant. The flywheel 505 uses centrifugal force growth as the rotors 510 speed increases to regulate the output voltage. Therefore, the voltage range is reduced and current requirements are reduced. The flywheel 505 is lighter, smaller and more efficient because the current requirement is reduced.

Figure 12A:
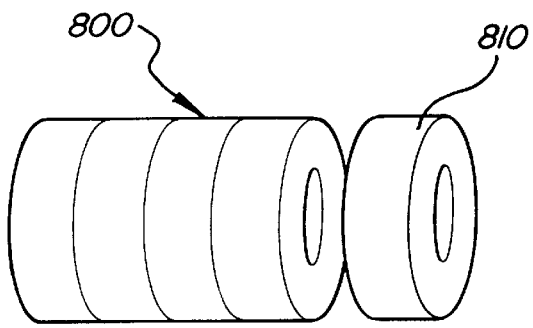

Preferably, the rim 556 is fabricated from a high strength composite material such as a carbon/fiber composite. In this example, the rim 556 includes a plurality of rim segments or disks 810, as shown in FIG. 12A, balanced and bonded together using a high strength epoxy such as Hercules 8552. Each segment 810 is oriented radially to the others to distribute the imbalance of each segment 810 to achieve an optimum rim 556 balance, while minimizing the bonding stress between adjacent segments 810. The interior surface of the rim 556 is divided into a first rim section 557 which is adjacent to the stator 515, and a second rim section 558 which is not adjacent to the stator 515. The first section 557 includes a magnet 560 disposed thereon. It should be appreciated in the example the magnet 560 is composed of a plurality of magnet segments. Preferably, the magnet 560 is a segmented rubberized soft magnet to survive in the environment of a growing flywheel 505. Typically, rare earth magnets are very brittle, and since the flywheel 505 grows approximately 2%, a rare earth magnet would not survive. Therefore, a soft magnet 560 includes pulverizing a magnet 560 into microscopic particles and adding rubber to the particles. An oxide coating is then applied to the magnet 560.

The second section 558 includes a mass 565, such as a balance weight, disposed thereon. It should be appreciated that in this example the mass 565 simulates the weight of the magnet 560 to ensure uniform radial growth of the rotor 510 as it rotates. Further, the uniform bore loading minimizes rotor 510 shear stresses as well as radial stresses.

A hub 580 rotatably interfaces with an axially positioned stationary shaft 585. In this example the hub 580 interfaces with the shaft through a plurality of mechanical bearings (not shown but well known in the art). At least one, and preferably a plurality of spoke planes 582 having at least one radially extending spoke 584, preferably a plurality, radiate in an outwardly manner from the hub 580. The end of the spoke 584 slidingly engages the rotor 510. The sliding spoke interface allows for hub 580 growth and relative movement between the spokes 582 and the rim 510 under high centrifugal force as the rotor speed increases. In this example there are two spoke planes 582 each having eight spokes 584. The spokes 584 are, for example, at 45 and 90 degrees from each other respectively to maintain hub 580 and rotor 510 balance while allowing for growth. The hub 580 and spokes 584 in this example are fabricated from a high strength steel such as AERMET 100.

The critical speed is the rotational speed where the spoke 584 exhibits bending. A thinner more flexible or super critical spoke 584 has a lower critical speed, whereas a stiffer, thicker spoke 584 has a higher critical speed. If the spoke 584 has a thicker shape with a higher in plane bending stiffness, the rotating spoke 584 is sub-critical because it moves the resonant frequency of the hub and rotor above the maximum operating speed of the flywheel 580. Therefore, a subcritical spoke 584 allows for higher operating speeds without having to pass through a critical speed as in a supercritical spoke design 584. In this example the shape of the spoke 584 tapers from thicker adjacent to the hub 580, to thinner near the rim 510. It should be appreciated that the optimum shape of the spoke 584 is preferably a non-linear taper to minimize centrifugal stresses, while maintaining adequate stiffness.

Figure 7:
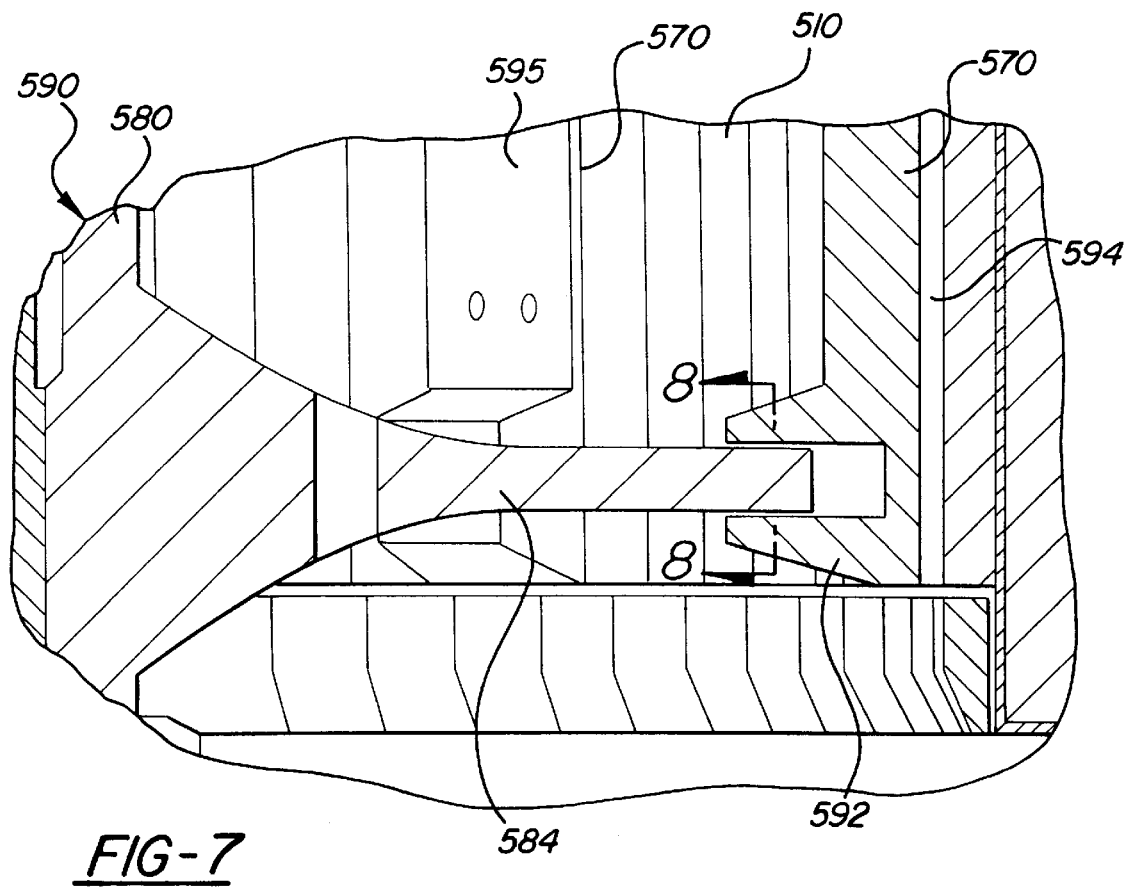
FIG. 7 is a side view of the rotor and hub interface according to the present invention.
Figure 8:
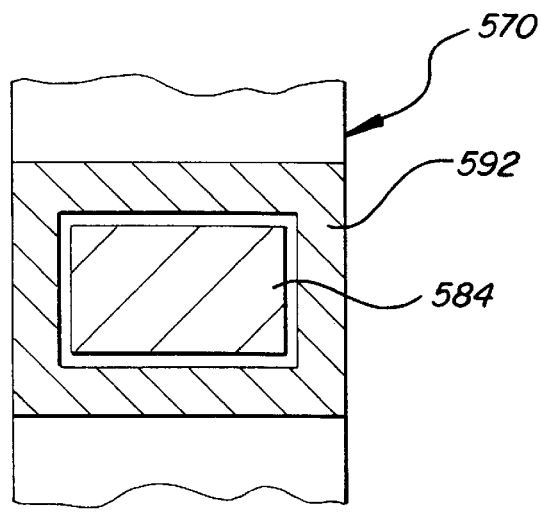
FIG. 8 is a sectional view taken along lines 8—8 of FIG. 7 of the rotor and hub interface according to the present invention.

Referring also to FIGS. 7 and 8, the rotor to hub interface 590 is illustrated. A socket 592 is disposed between the spoke 584 and the rotor 510. Preferably, aluminum is used for the socket 592 because it is light-weight, yet relatively strong. In this example the socket 592 is shaped to slidingly engage an end of a spoke 584. A middle layer 594 having an adhesive on each side is interposed between the socket 592 and the rotor 510 to distribute loads exerted on the rotor. Preferably, the middle layer 594 is formed from a material which allows hoop strain mismatch between the composite rotor 510 and the socket 592, such as polyethylene.

In the preferred embodiment, an attachment receptacle 570 includes a pair of sockets 592 on either end of a solid bar 595 to simultaneously engage with a spoke 584 from each of the two spoke planes 582. In this example, there are eight attachment receptacles 570 in each spoke plane 582, and the attachment receptacles 570 are bonded to the rotor 510, as previously described.

A plurality of longitudinally extending balance bars 596 are positioned between each attachment receptacle 570. The balance bars 596 are designed to match the centrifugal loading imparted on the rotor 510 by the adjacent receptacle 570, and magnet 560, improving the stress efficiency of the rim 556. Preferably, the balance bar 596 is fabricated using a laminate construction technique to minimize eddy currents. In this example, there are 6 balance bars 596 adjacent a spoke 584. The balance bars 596 are bonded to the rotor 510. To balance the rotor 510, material may be removed from the balance bar 596. Preferably, the middle layer 594 having an adhesive on each side is interposed between the balance bar 596 and the rotor 510.

A speed and position sensing mechanism provides the power controller 135 described in FIG. 2 with information regarding how fast the hub 580 is rotating or the relative position of the hub 580. For example, an optical encoder disc 600 disposed on the hub 580 passes through a stationary read head mechanism 605 as the hub 580 rotates. In this example the read head 605 is positioned on the stator 515. The read head mechanism 605 transmits the speed and position of the hub 580 to the power controller 135, to control the energy storage capability of the flywheel 505.

Figure 9:
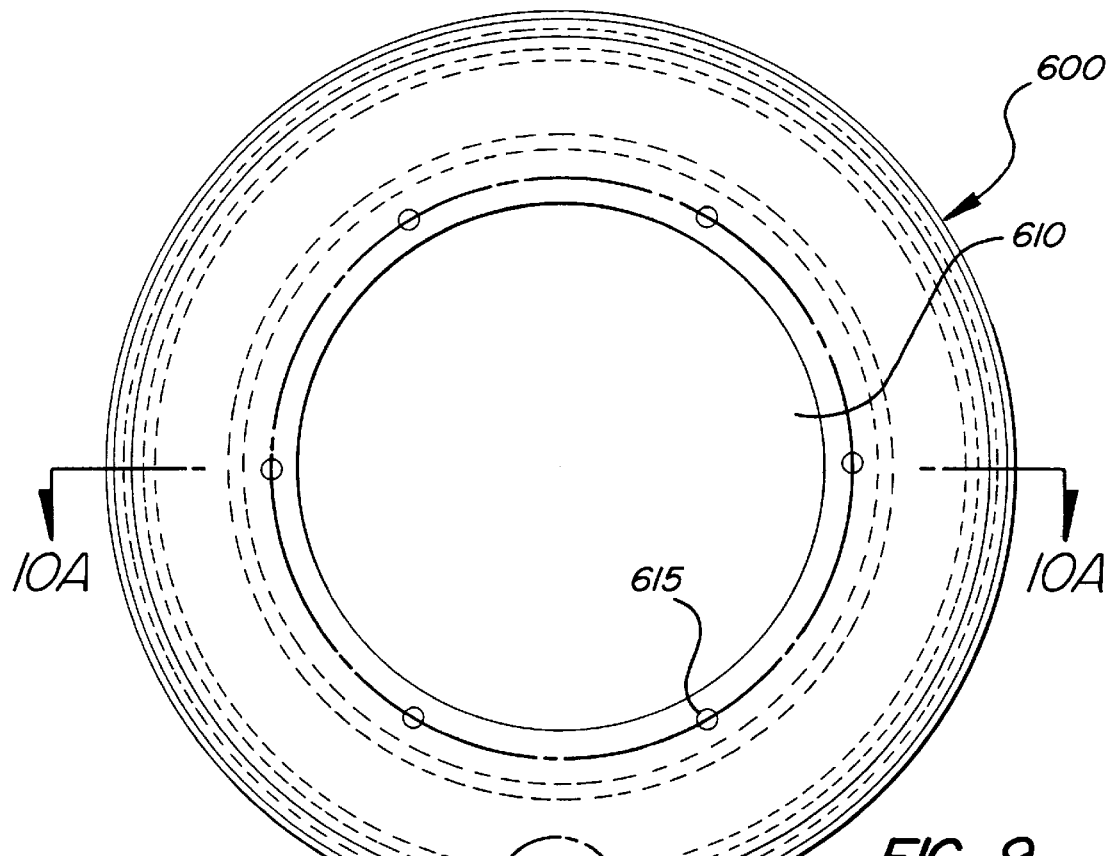
FIG. 9 is a perspective view of an optical encoder disc according to the present invention.
Figure 10A:
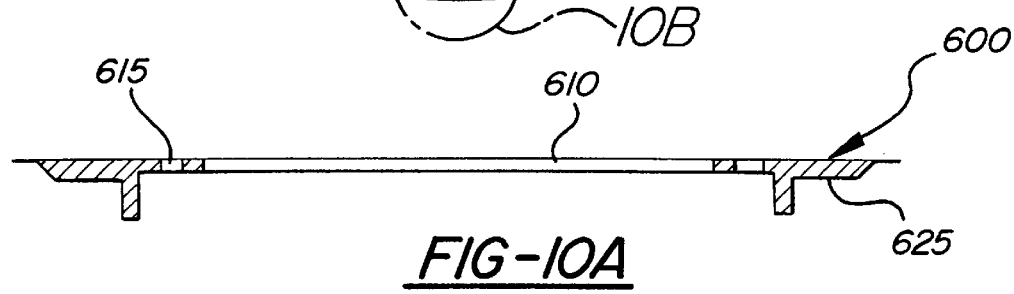
FIG. 10A is a sectional view taken along lines 10—10 of FIG. 9 of an optical encoder disc according to the present invention.
Figure 10B:
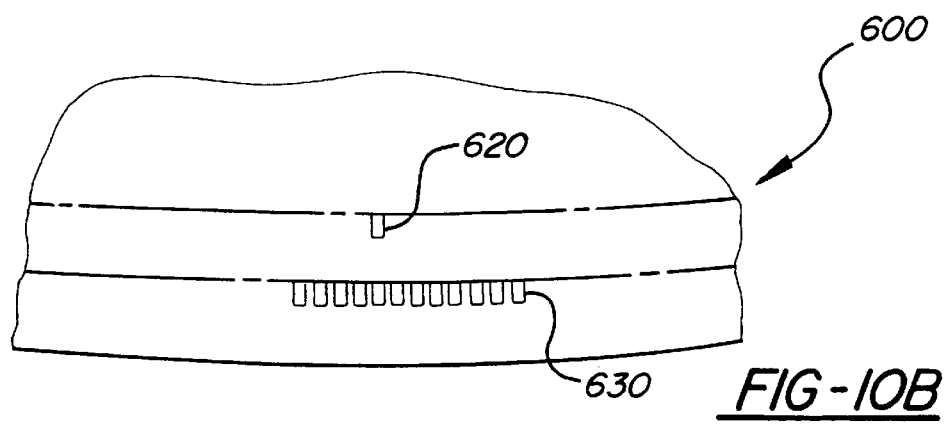
FIG. 10B is an enlarged view of circle 9 of FIG. 9 of the slots in an optical encoder disc according to the present invention.

Referring to FIG. 9, 10A and 10B, an optical encoder disc 600 is illustrated. The encoder disc 600 has a generally circular shape, and the center of the disc 610 has an opening therein for centering the encoder disc on the hub 580. The disc 610 is attached to the hub 580 by a suitable means, such as with bolts 615. The disc 600 rotates with the hub 580 at a high speed and is subject to centrifugal loading. Therefore, construction considerations of the disc 600 include that it remain flat, relatively axially rigid, and has acceptable radial growth as it rotates.

A first radial length of the encoder disc 600 includes at least one, preferably a plurality of slots 620 equally spaced around the perimeter of the disc 600. For example, the length of a slot 620 is approximately 0.015 in., width 0.006 in., and there are 10 slots 620 in number. A second radial length includes at least one, preferably a plurality of elongated slots 630 spaced around the perimeter of the disc 600. For example, there are 1280 elongated slots 630 in number.

The disc 600 is thickest at its rotational axis, and is progressively thinner toward the outer edge of the disc 600 until the maximum light passes through the slots 620, 630 with minimum reflection and fringe effects. If the disc 600 had a uniform thickness throughout, then as the disc 600 was rotating, the resulting radial growth would affect the accuracy. By progressively decreasing the thickness of the disc along an increasing radius 625, the original geometry and alignment of the disc 600 with the read head 605 is maintained.

Figure 11:
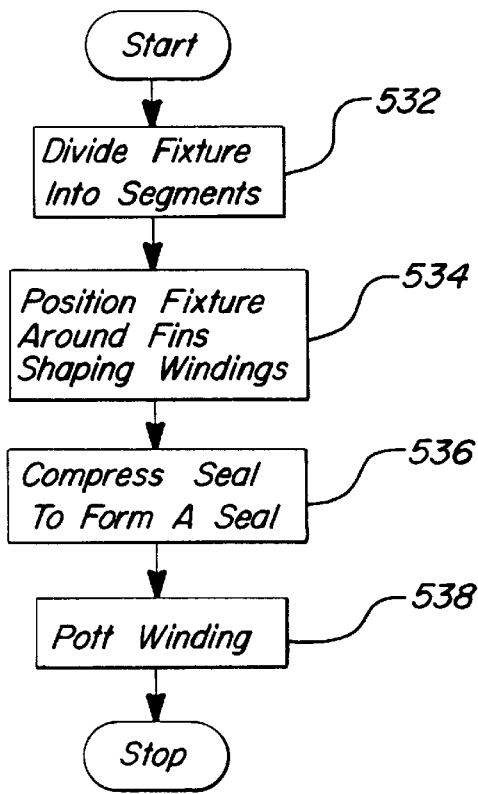
FIG. 11 is a flowchart of a methodology for assembling a winding to a stator according to the present invention.

Referring to FIG. 11, a methodology for assembling the winding 530 to the stator 515 is illustrated. The winding 530 is preshaped on a forming fixture (not shown but well known in the art) and then installed on the bobbin 522. The forming fixture defines the outer diameter of the finished stator 515 and draws a potting medium such as an epoxy into the desired locations. The methodology begins in block 532 by dividing a cylindrical forming fixture into a plurality of segments, such as four. The fixture includes a slightly compressible seal made from a material such a aluminum at each of the joints separating a segment. The seal prevents the entry of epoxy during potting. Advancing to block 534, the methodology positions the fixture around the fins 525, shaping the windings 530 into a cylindrical form. Advancing to block 536, the methodology compresses the seal forming a seal. Advancing to block 538, the methodology pots the winding 530, as is known in the art, such as under alternate cycles of vacuum and pressure.

Referring to FIGS. 12A through 12M, a methodology for constructing a rotor 800 is illustrated. The rim 805 is exposed to hoop stress, or internal loads in a circumferential direction. Therefore, hoop stress efficiency to minimize stress is accomplished by the construction methodology of this example. Radial, axial and shear stresses are also considered.

Figure 12B:
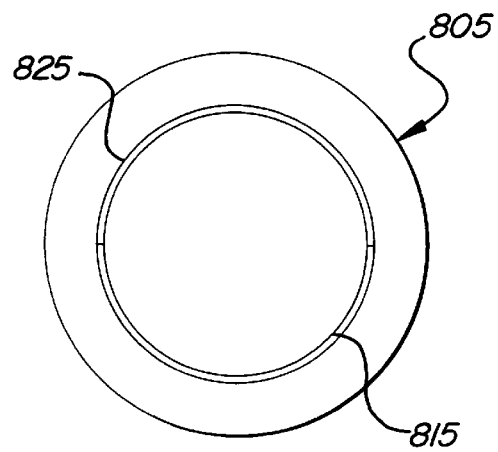

The methodology begins in Step 1 and at least one, preferably a plurality of rim segments 810 or disks are fabricated, such as by wrapping a hoop with tape. Proceeding to Step 2 as shown in FIG. 12A, the rim segments 810 are bonded together. In this example, each rim segment is balanced and bonded to another rim segment 810 using a high strength epoxy such as Hercules 8552 resin. Each segment 810 is oriented radially to the others to distribute the imbalance of each segment 810 to achieve an optimum rim 805 balance, while minimizing the bonding stress between adjacent segments 810. Proceeding to Step 3, a first lamina panel 815 is fabricated, such as a 1 ply panel of +/−45° epoxy graphite. In this example, lamina panels of + and −45° are used throughout, because as the rim 805 grows, the wrap will pull the rim 805 together, reducing its axial shear stress. Proceeding to Step 4 as shown in FIG. 12B, the lamina panel 815 is bonded to the inner diameter of the rim 825. It should be appreciated that in this example the lamina panel 815 is applied in two pieces.

Figure 12C:
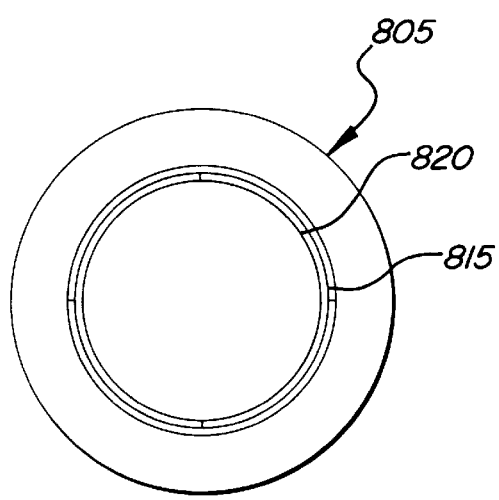

Proceeding to Step 5, a second lamina panel is fabricated 820, such as a 2-ply panel of +/−45° epoxy graphite. Proceeding to Step 6 as shown in FIG. 12C, the second lamina panel 820 is bonded to the inner diameter of the rim 825. It should be appreciated that in this example the lamina panel 820 is applied in two pieces, such that the seam lines of the first and second lamina panels 815, 820 are staggered.

Figure 12D:
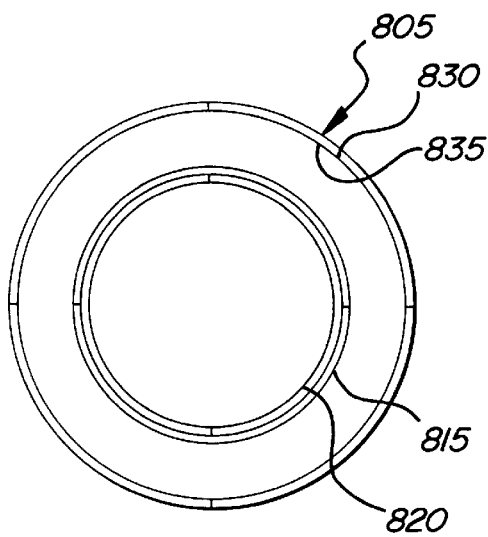
Figure 12E:
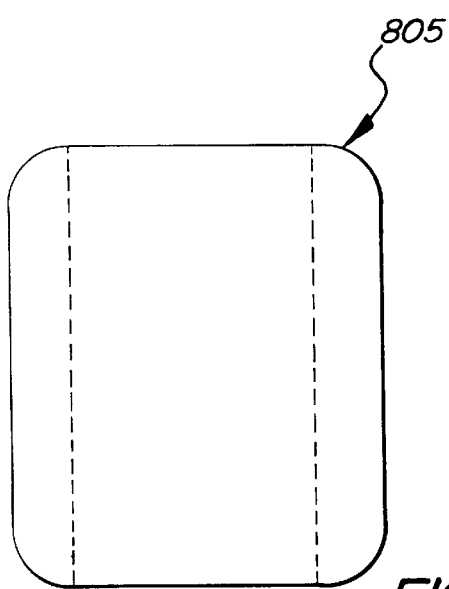

Proceeding to Step 7, a third lamina panel 825 is fabricated, such as a 2-ply panel of +/−45° epoxy graphite. Proceeding to Step 8 as shown in FIG. 12D, the third lamina panel 830 is bonded to the outer diameter of the rim 835. It should be appreciated that in this example the lamina panel 830 is applied in four pieces. Proceeding to Step 9 as shown in FIG. 12E, the outer diameter of rim 835 and inner diameter of rim 825 and top and bottom radii are machined to have a radius end. The rounded shape of the top and bottom radii will reduce high stress corners.

Figure 12F:
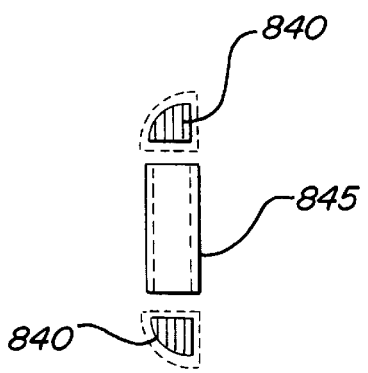

Proceeding to Step 10 as shown in FIG. 12F, the mass 565 and magnet 560 are prepared. Preferably, the mass 565 is constructed of segments having laminated layers; including two end mass segments 840 of tantalum laminate bonded together with UHMW polyethylene, and a middle mass segment 845 of G-10 laminate bonded together with UHMW polyethylene. It should be appreciated that end mass segments 840 are placed on the inner diameter to help contain the magnets 560 and balance the mass 845 axially. Preferably, Tantulum is used for the end mass segments 840 because its high density and laminated construction allow the segment density to be tuned to match that of the magnet 560, therefore generating equivalent centrifugal forces along the radius. Tantulum is also advantageous because it is soft radially, stiff axially and offers no magnetic resistance. The shape of the Tantulum end mass segment 840 is chosen to minimize intra-lamina shear stress of the rim 556. The Tantulum lamina are bonded together with polyethylene. The laminated construction eliminates eddy currents. It should also be appreciated that G-10, in combination with the receptacle 570 and balance bar 596, provide centrifugal loading to the rim 556 equal to that of the magnet 560 alone.

Proceeding to Step 11 as shown in FIG. 12G, the magnet 560 is bonded to the inner diameter of the rim 825. Preferably the magnet 560 is a plurality of magnet segments. Proceeding to Step 12 as shown in FIG. 12H, the mass segments 840, 845 are bonded to the rim 825.

Proceeding to Step 13, a fourth lamina panel 855 is fabricated, such as a 2-ply panel of +/−45° epoxy glass. Proceeding to Step 14 as shown in FIG. 12I, the fourth lamina panel 855 is bonded to the inner diameter of the rim 825. It should be appreciated that in this example the lamina panel 855 is applied in 4 pieces. Proceeding to Step 15 as shown in FIG. 12J, a plurality of inner ply segments 860 are prepared, such are from +/−45° epoxy glass. Proceeding to Step 16 as shown in FIG. 12K, the inner segments 860 are arranged two layers thick on the inner diameter of the rim 825 and onto the top and bottom radii, and bagged and cured as is known in the art.

Proceeding to Step 17 as shown in FIG. 12L, a plurality of outer ply segments 865 are prepared, such are from +/−45° epoxy graphite. Proceeding to Step 18 as shown in FIG. 12M, the outer segments 865 are arranged two layers thick on the outer diameter of the rim 835, onto the top and bottom radii and into the inner diameter of the rim 825, and bagged and cured as is known in the art. It should be appreciated that the carbon fiber or epoxy glass overwrap completely encloses the rim and is in tension to help contain the axial stress.

Figure 13:
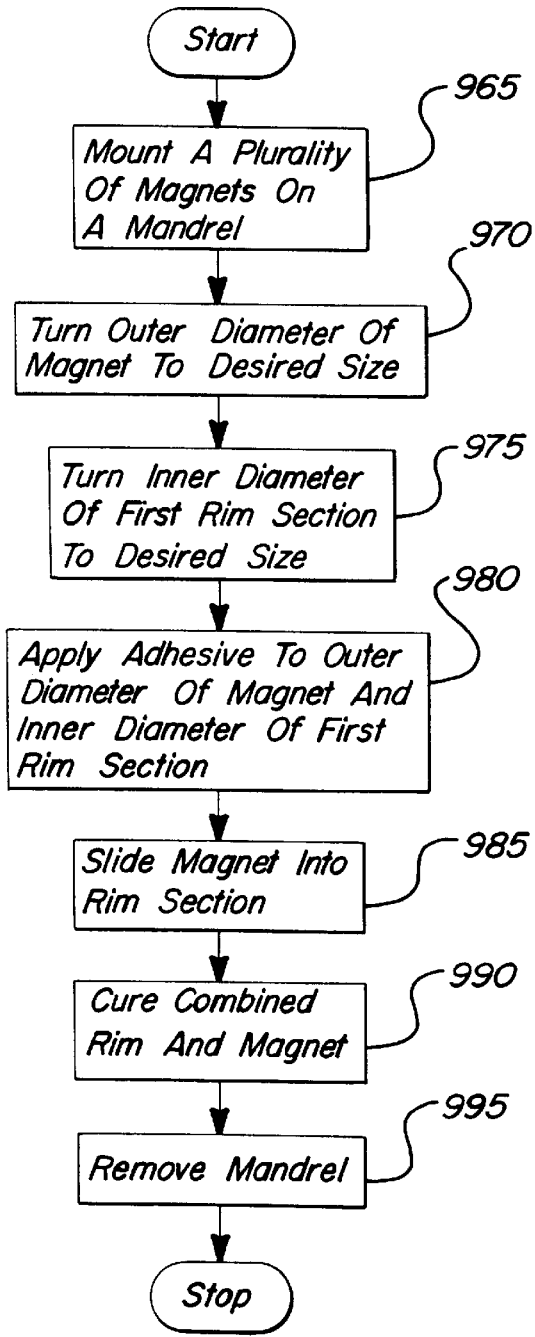
FIG. 13 is a flowchart of a methodology for assembling a magnet to a rim according to the present invention.

Referring to FIG. 13, a methodology for assembling the magnet to the rim is illustrated. The assembly of the magnet 560 to the first rim section 511 is critical in controlling the gap 562 between the stator winding 530 and the inner diameter of the magnet 560. The performance and efficiency of the flywheel 505 is affected by the dimension of the gap 562. The methodology begins in block 965 by mounting a plurality of magnets 564 on a mandrel (not shown but well known in the art). The methodology advances to block 970 and the outer diameter of the magnet 560 is turned, as is known in the art, to a desired size. Advancing to block 975, the methodology turns the inner diameter of the first rim section 511 to a desired size. Advancing to block 980, the methodology applies adhesive to the outer diameter of the magnet and the inner diameter of the first rim section 511. Advancing to block 985, the methodology slides the magnet into the rim section 511. Advancing to block 990, the methodology heats the combined magnet and rim until the adhesive cures. Advancing to block 995, the methodology removes the mandrel.

Figure 14:
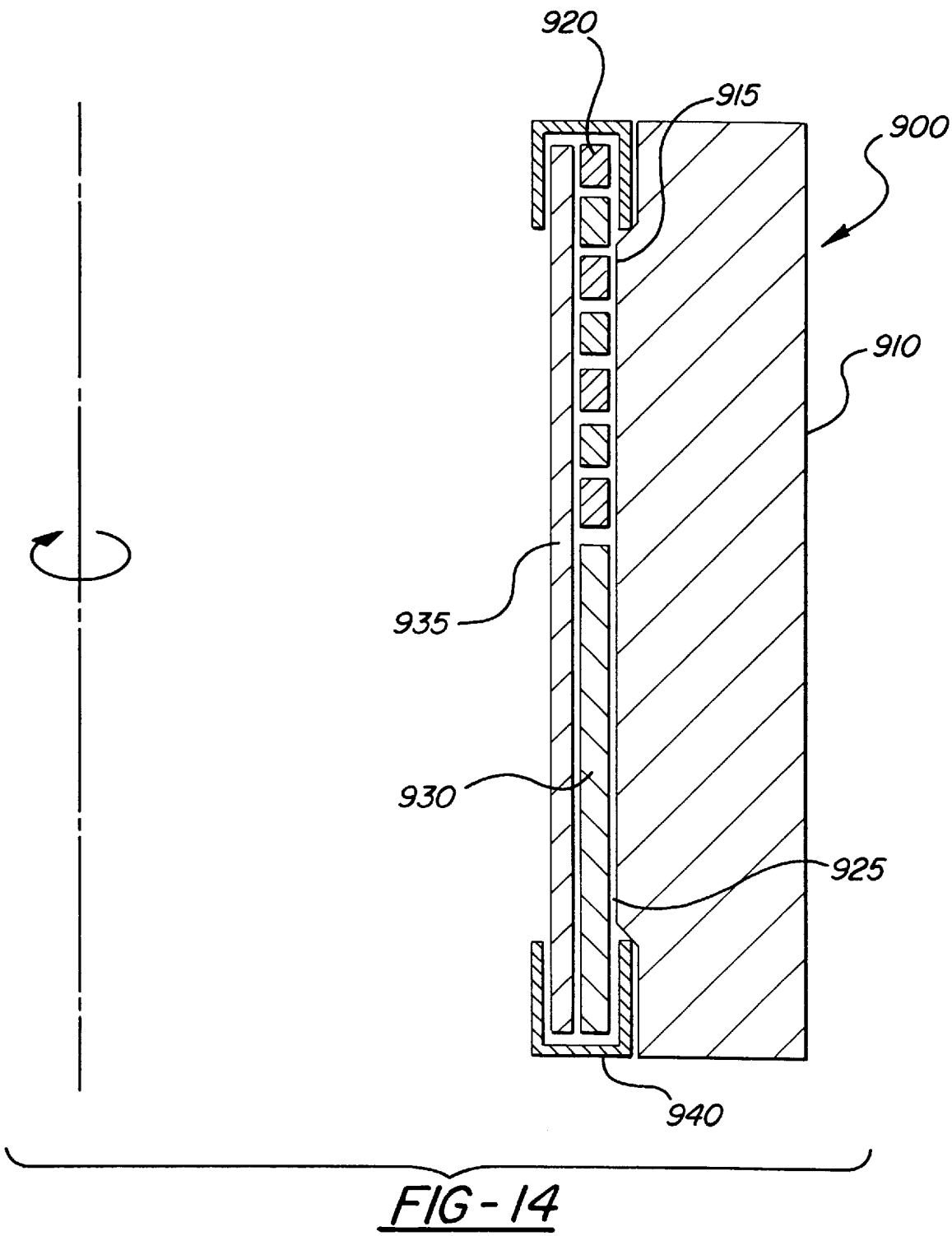
FIG. 14 is a perspective view of an alternative rim construction for the rotor according to the present invention.

Referring to FIG. 14, an alternate construction of a rim for the rotor is illustrated. The alternate rim embodiment 900 includes a one piece rim 910 having filaments wound thereon and no outer overwrap. In a one piece rim 910, the filaments would be predominantly wound in the 0° direction with a small proportion wound at a suitable bias angle to provide the desired strength characteristics. It should be appreciated that 0° is pure hoop direction. A first section of the inner diameter of the rim 915 has at least one, preferably a plurality of magnets 920 bonded thereon. A second section of the inner diameter of the rim 925 has a mass 930 bonded thereon to simulate the weight of the magnet 920. A liner 935 is positioned adjacent the magnet 920 and mass 930 to align the magnet 920 and mass 930. Preferably, the liner 935 is constructed from one piece and has filaments wound around it. A cap 940 may be positioned over an open end of the magnet 920 and an open end of the mass 930 to prevent axial growth at the ends.

Figure 15:
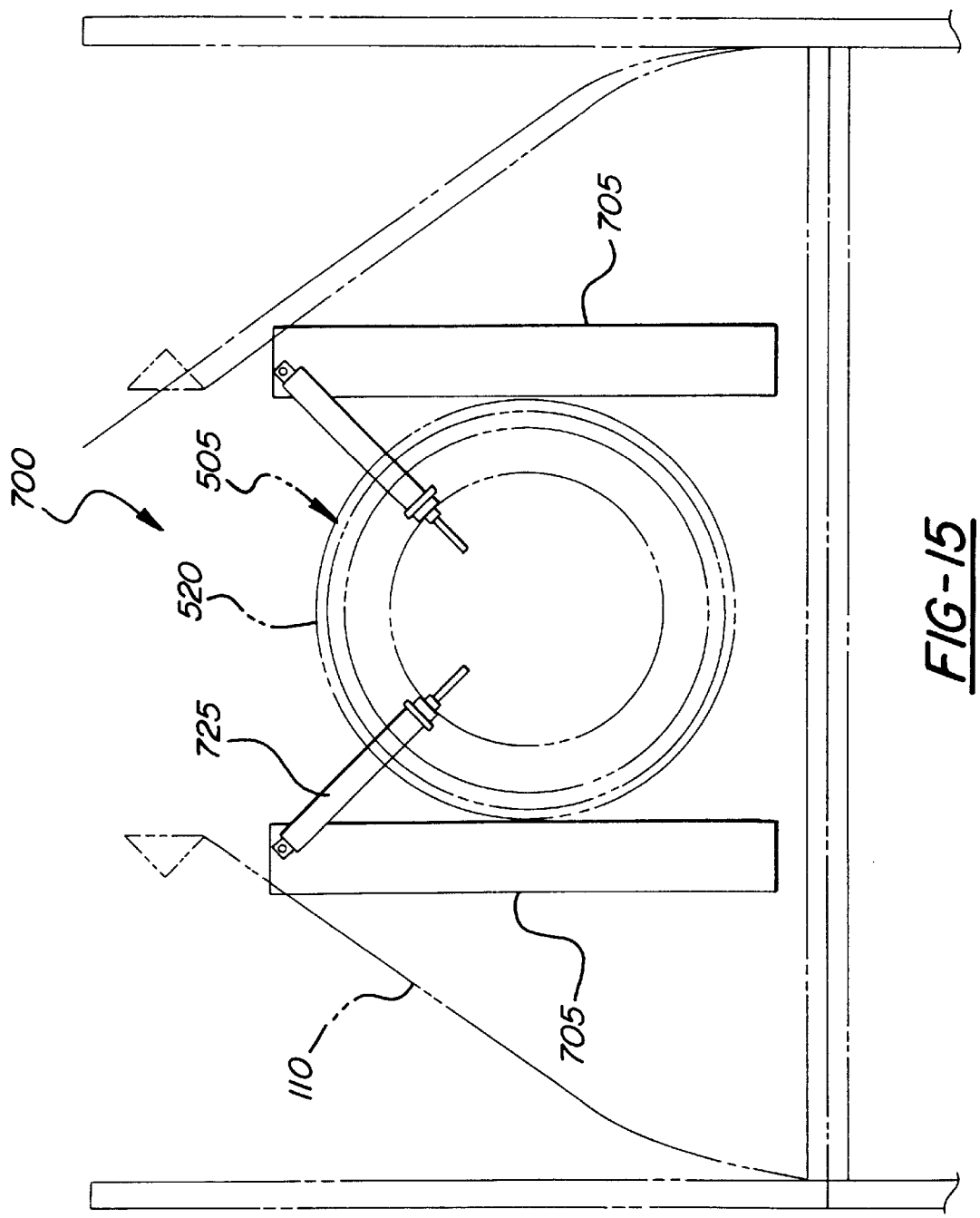
FIG. 15 is a plan view of a gimbal support system according to the present invention.
Figure 16:
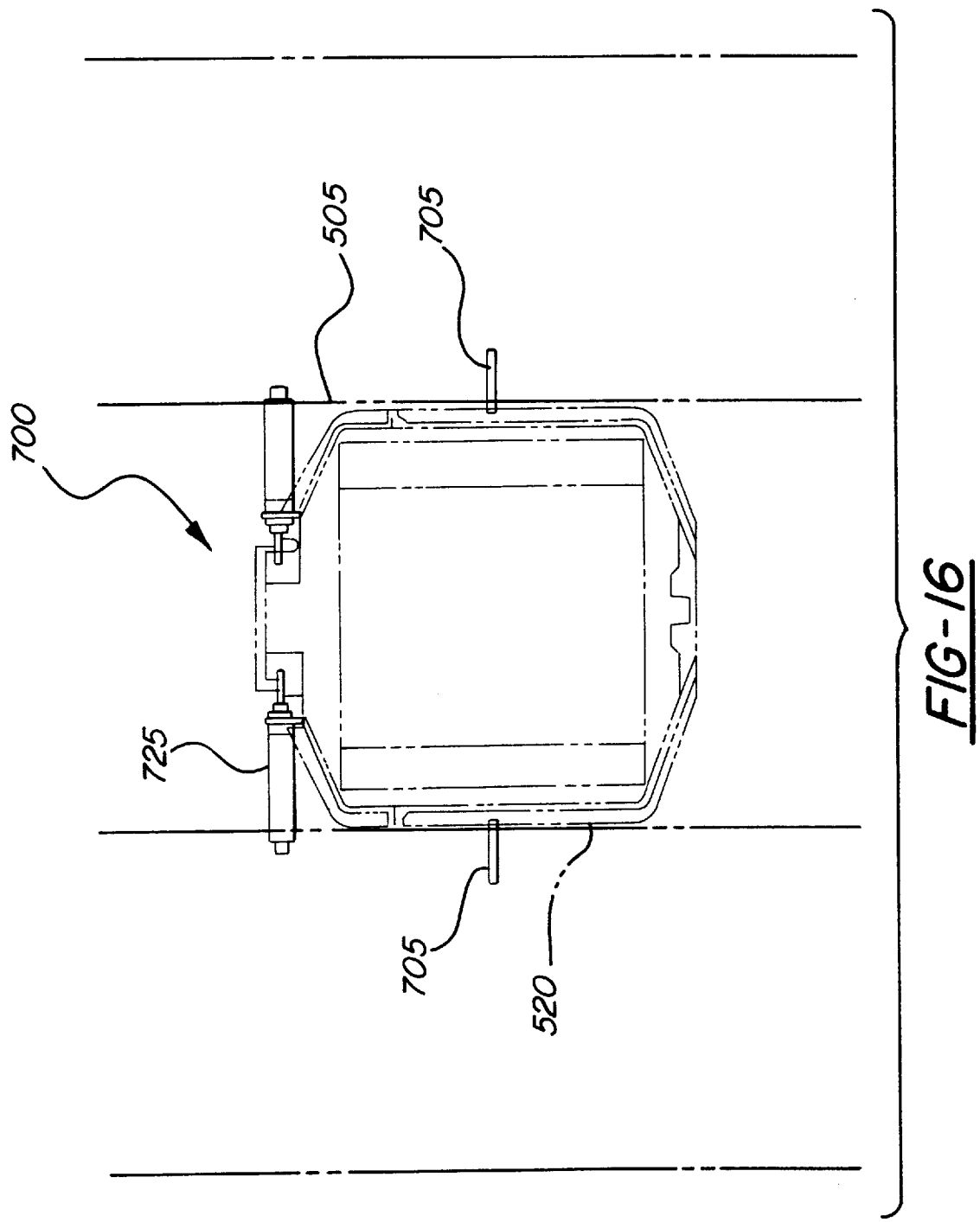
FIG. 16 is a side view of a gimbal support system according to the present invention.

Referring to FIGS. 5, 15, and 16, a gimbal support system is illustrated. It should be appreciated that the gimbal system supports an apparatus mounted to a frame. The gimbal system 700 of this example supports the flywheel 505 from the chassis 110 of the vehicle 100, allowing the flywheel 505 to have uni-directional pitch and roll stiffness isolating it from the motion of the vehicle 100. For example, if the vehicle 100 turns a corner and the chassis 110 rolls, the flywheel 505 remains relatively stationary.

The gimbal system 700 includes at least two parallel flexible beams 705, such as a leaf spring in a Hotchkiss-type vehicle application. The beams 705 are positioned on either side of the housing 520, extending perpendicular to the spin axis of the flywheel 505. It should be appreciated that the total free length of each beam 705 is equal to the distance between the beam 705 centers.

The flywheel 505 is centered between the beams 705, and attached by a suitable means, such as with bolts. A first and second end of each beam 705 attaches to the chassis 110 of the vehicle 100. For example, a pair of opposing ledges 710 integral with the chassis 110 have a raised perpendicular knife edge 715 for supporting the first and second end of the beam 705, respectfully. This type of support is advantageous due to its simplicity and light weight.

At least one dampening mechanism 725, such as an external damper, dampens the motion of the flywheel 505 relative to the motion of the vehicle 100. A first end of the dampening mechanism 725 attaches to the chassis 110 (not shown) and a second end of the dampening mechanism 725 attaches to an external face of the flywheel housing 520, preferably near the top centerline of the housing 520. Preferably, there are two dampers 725 each located 45 degrees from a centerline of the beam 705 and 90° from a spin axis passing through the flywheel 505.

The present invention has been described in an illustrative manner. It is understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed:

1. A gimbal system adapted for supporting an apparatus from a vehicle, said gimbal system comprising:

at least two parallel flexible beams adapted to be positionable on opposed sides of the apparatus and to extend perpendicular to a longitudinal axis of the apparatus, said beams being spaced such that a free length of one of said beams is substantially equal to a distance between centers of said beams, said beams further adapted for receiving the apparatus in a position near the centers of said beams;

each of said beams having a first end and a second end adapted to be mounted to the vehicle; and at least one dampening mechanism adapted to be attached at a first end to the apparatus and at a second end to the vehicle, whereby said gimbal system provides symmetrical roll stiffness about at least one dampening axis independent of the motion of the vehicle.

2. The gimbal system of claim 1 wherein said beams are leaf springs.

3. The gimbal system of claim 1, further comprising a pair of opposing ledges adapted to be mounted to the vehicle, each of said opposing ledges having a perpendicular edge for supporting said first end and said second ends of said beams.

4. The gimbal system of claim 1 wherein said dampening mechanism is a hydraulic damper.

5. The gimbal system of claim 1 wherein said dampening mechanism is adapted to attach to the apparatus at a 45 degree angle from a centerlines of said beam and 90° from said longitudinal axis passing through the apparatus.

6. A gimbal system adapted for supporting a flywheel from a vehicle, said gimbal system comprising:

at least two parallel extending flexible beams adapted to be positionable on opposed sides of the flywheel and to extend perpendicular to a spin axis of the flywheel, said beams being oriented such that a free length of one of said beams is substantially equal to a distance between centers of said beams, said beams further adapted for receiving the flywheel in a position near the centers of said beams;

each of said beams having a first end and a second end adapted to be mounted to the vehicle; and at least one dampening mechanism adapted to be attached at a first end to the flywheel and at a second end to the vehicle, whereby said gimbal system provides symmetrical roll stiffness about at least one dampening axis independent of the motion of the vehicle.

7. The gimbal system of claim 6 wherein said beams are leaf springs.

8. The gimbal system of claim 6, further comprising a pair of opposing ledges adapted to be mounted to the vehicle, each of said opposing ledges having a perpendicular edge for supporting said first ends and said second ends of said beams.

9. The gimbal system of claim 6 wherein said dampening mechanism is a hydraulic damper.

10. The gimbal system of claim 6 wherein said dampening mechanism is adapted to attach to the flywheel at a 45 degree angle from centerlines of said beams and 90° from said spin axis passing through the flywheel.

* * * * *